Inventors: Francis G. Bollo
John R. Tomlinson
By their Attorney:

Dec. 18, 1945.  F. G. BOLLO ET AL  2,391,291
FUEL CONTROL SYSTEM FOR INTERNAL-COMBUSTION ENGINES
Filed Jan. 2, 1945  4 Sheets-Sheet 2

Inventors: Francis G. Bollo
John R. Tomlinson
By their Attorney:

Dec. 18, 1945.  F. G. BOLLO ET AL  2,391,291
FUEL CONTROL SYSTEM FOR INTERNAL-COMBUSTION ENGINES
Filed Jan. 2, 1945  4 Sheets—Sheet 4

Inventors: Francis G. Bollo
John R. Tomlinson
By their Attorney:

Patented Dec. 18, 1945

2,391,291

UNITED STATES PATENT OFFICE 2,391,291

FUEL CONTROL SYSTEM FOR INTERNAL-COMBUSTION ENGINES

Francis G. Bollo, Berkeley, and John R. Tomlinson, Walnut Creek, Calif., assignors to Shell Development Company, San Francisco, Calif., a corporation of Delaware Application January 2, 1945, Serial No. 571,067

10 Claims. (Cl. 123—119)

This invention pertains to the control of internal combustion engines of the spark ignition type, and relates more particularly to a control system for automatically maintaining the operation of an engine at its lowest or most economical specific fuel consumption rate.

The principles on which the organization and operation of the system of the present invention are based, as well as the objects of said invention, will be understood from the following description taken with reference to the attached drawings, wherein.

For purposes of simplicity, the control system of the present invention will be described mainly with regard to aircraft engines, it being understood that said system is not limited to application in such engines and may as well be used with other engines of the land or marine transportation types, or with stationary installations.

Modern internal combustion engines of the spark ignition type usually employ automatic fuel metering means, such for example as automatic carburetors or fuel injectors, for supplying to the engine a fuel-air mixture at predetermined fuel-air ratios to fit particular operating conditions. This type of control, however, does not always provide the optimum mixture for each operating condition, particularly during relatively long periods of stable operation, where the mixtures are apt to be richer than desired for best economy. Since an accurate and instantaneous measurement of the fuel consumption rate is rarely available to the operator, a manual adjustment of the fuel-air ratio between values determined by the setting of the automatic carburetor is not practicable.

It has been found that the combustion temperature of internal combustion engines of the spark ignition type, as determined, for example, by measuring the temperature of exhaust gases, varies with the fuel-air ratio of the mixtures supplied to said engines, the maximum temperature being developed at fuel-air ratios which give the best or very nearly the best engine fuel economy. Sharply lower exhaust temperatures result from relatively small changes in fuel-air ratio in either direction from this desired value.

Figure 2:
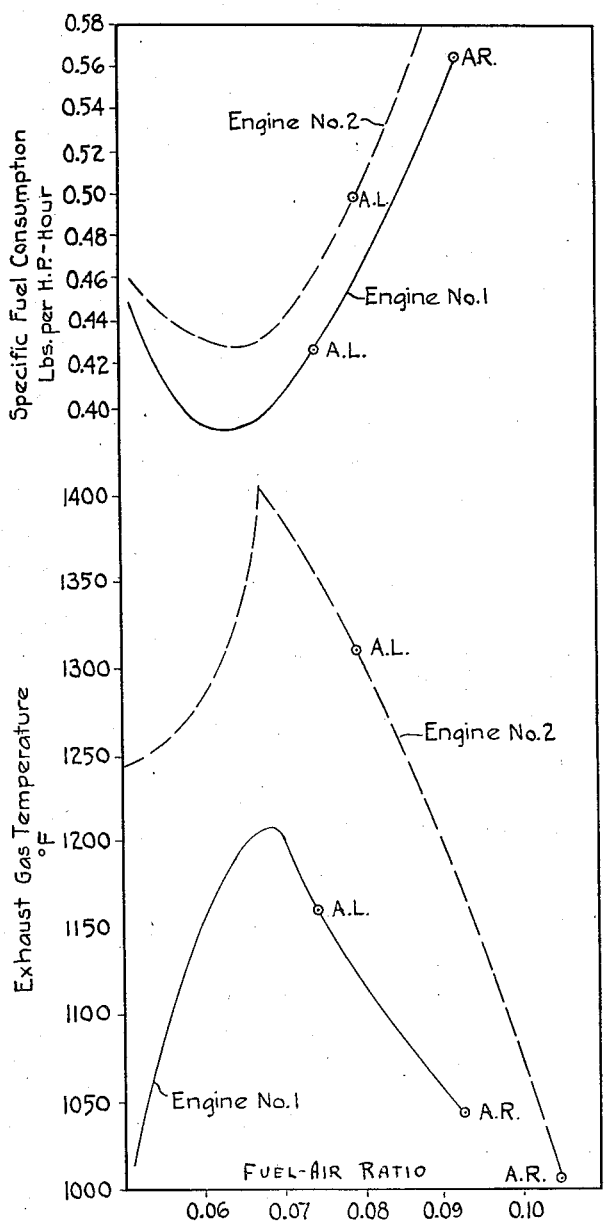
Fig. 2 is a chart diagram showing the relation between the exhaust temperature of a spark ignition-type engine and the fuel-air-ratio of the mixture supplied thereto by the fuel-metering means.

Fig. 2 gives exhaust gas temperature and specific fuel consumption values plotted against fuel-air ratios for two typical engine performances. In both cases, a sharply defined temperature peak prevails at, or quite close to, the fuel-air ratio giving maximum economy. The points marked "A. L." and "A. R." refer to values obtained with the "Automatic-Lean" and the "Automatic-Rich" settings of the automatic carburetor. It will be seen that neither of these settings gives the most economical operation, which in both cases lies outside of the range provided by the automatic carburetor.

It is therefore an object of this invention to provide a control system for automatically maintaining the setting of the fuel-injector means of an internal-combustion engine at its most economical fuel-air ratio, said setting corresponding to approximately the highest temperature developed by the engine as said fuel-air ratio is varied.

It is also an object of this invention to provide for the purpose described a control system adapted to actuate the fuel-metering or fuel-injector means regulating the fuel-air ratio of the mixture supplied to the engine for combustion, said actuation being effected periodically or cyclically, that is, at predetermined time intervals.

It is also an object of this invention to provide a system adapted to effect said actuation of the fuel-metering means in one direction throughout operative portions of consecutive cycles as long as the temperature of the engine, and more particularly its exhaust temperature, does not change in a negative direction, that is, toward lower temperature, and to reverse the direction of said actuation when the temperature of the engine decreases.

It is also an object of this invention to provide a system adapted to actuate the fuel-metering means so as to effect a substantially continuous smooth or linear change in the fuel flow to the engine.

Other objects of the present invention will be clear from the following description thereof.

Figures 1, 4:
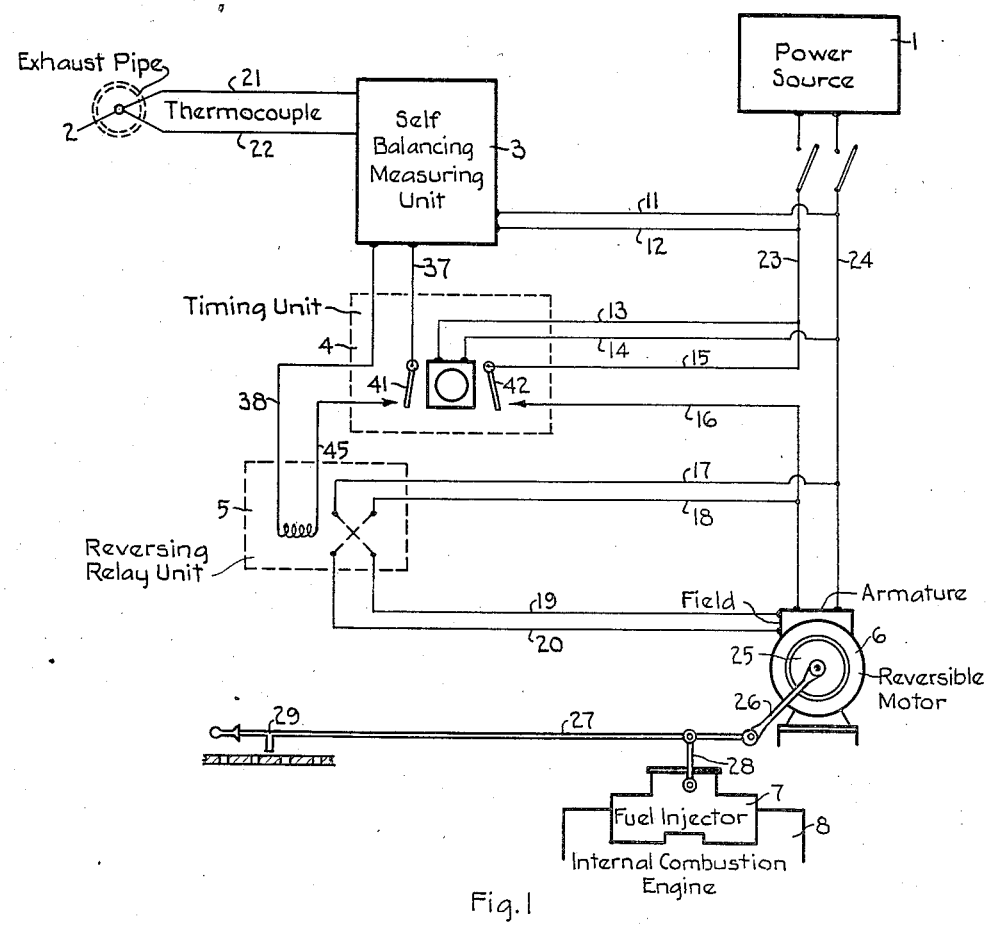
Fig. 1 is a diagram showing the general arrangement of the units forming the system of the present invention.
Fig. 4 is a diagrammatic detail of another embodiment of a self-balancing measuring bridge.

Referring to the diagram of Fig. 1, the system of the present invention comprises the following elements suitably cooperating with each other by electrical or mechanical means: a temperature-responsive unit such as a thermocouple 2; a measuring bridge unit 3 such for example as a self-balancing potentiometer; a timing or cycling unit 4; a reversing relay unit 5. The system may also comprise a common source of A. C. or D. C. operating power, although it is understood that the units of the system may be alternatively provided, whenever desirable, with individual sources of operating power, and a motor 6, controlled by the present system to actuate the fuel-metering means, although means other than a motor may be used, if desired, to effect such actuation. Although the terminals of the various electrical units of the diagram are shown in all cases to be connected to each other by separate or double leads, the second lead may be eliminated whereever suitable by grounding the appropriate terminals, as will be understood by those familiar with electric circuits, and as shown for purposes of illustration at 38 and 38a only in Fig. 3.

The temperature-responsive element or thermocouple 2 is operatively installed in the engine in any suitable location under the effect of the engine temperatures, for example in a cylinder head. It is, however, preferred to install said thermocouple in the stream of the exhaust gases of the engine, for example in the exhaust pipe or manifold, since this position, first, insures the quickest response of the thermocouple to engine temperature changes; second, eliminates the effect thereon of extraneous factors, such as the coolant for the engine; and third, makes the thermocouple responsive to the temperatures of the engine as a unit, rather than to those of the individual cylinders. Furthermore, the exhaust gas, besides giving the quickest temperature response, also gives the largest temperature change.

The thermocouple 2 is connected by means of leads 21 and 22 to the self-balancing measuring bridge or potentiometer unit 3, which, as stated above, may be provided with its own power supply, or may receive its operating current from the power source 1 by means of leads 11 and 12.

The unit 3 preferably comprises a self-balancing potentiometer, such, for example, as that manufactured by the Brown Instrument Co., as described in their bulletin No. 15-4 (1942), or by the Tagliabue Manufacturing Company, as described in their catalog No. 1101E (1939), or by the Leeds and Northrup Company, as described in their catalog No. 33-161 (1940), etc.

Figure 3:
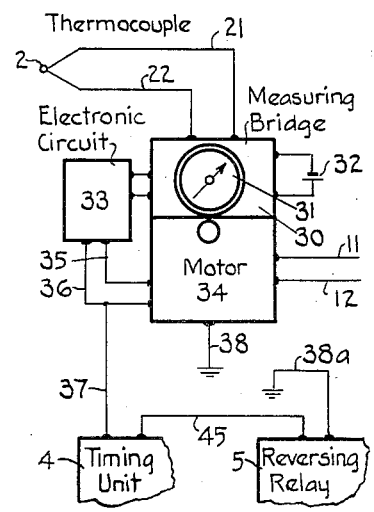
Fig. 3 is a diagram of self-balancing measuring bridge adapted for use in the present system.

The construction and operation of self-balancing potentiometers involving the use of a reversible motor, such, for example, as the Brown or the Tagliabue potentiometer, forms no part of this invention, and will be briefly outlined here with regard to the diagram of Figure 3 only as far as necessary for its application to the present system.

The voltage of the thermocouple 2 is balanced in a bridge circuit 30, comprising a pointer or a mirror-type galvanometer 31, against the constant voltage of a standard cell 32. Any change in the voltage of the thermocouple will unbalance the bridge circuit and cause a deflection of the galvanometer, which, by mechanical or photoelectric means involving an electronic circuit 33, will cause the motor 34 to rotate in the proper direction to re-set and rebalance the measuring circuit. The operating current for the motor and the electronic circuit is supplied from leads 11 and 12. If the galvanometer has deflected in response to a change of thermocouple voltage produced by an increase of exhaust temperature, the motor 34 is actuated in one direction by a current pulse received from the bridge circuit through a lead 35. If the galvanometer has deflected in response to a decrease of temperature, the motor is actuated in the other direction by a current pulse received from the bridge circuit through a lead 36. According to the present invention, the lead 36 is tapped by a lead 37 connected to the timing unit 4. It will therefore be seen that it is essential for the present invention that electric current be supplied from the self-balancing potentiometer to the timing unit only at such times as the potentiometer is being rebalanced to a new setting in response to a decrease of the temperature affecting the thermocouple.

If it is desired to use a self-balancing potentiometer using no reversible motor, such for example as a Leeds and Northrup potentiometer, such instrument can be adapted for the purposes of this invention in a manner shown in Fig. 4.

In self-balancing potentiometers of this type, a constant speed unidirectional motor 134 drives a shaft 130 carrying cams 132 and 133. An unbalanced condition of the measuring bridge circuit causes the galvanometer needle 131 to deflect from its normal position. The setting levers 135, by closing about the galvanometer needle in its off-center position, tilt the normally horizontal yoke 136 about its axis 137. On the next turn of the shaft 130, one of the cams 132 or 133 contacts the tilted yoke 136 and returns it to its horizontal position, thus moving suitable resistor wire contacts not shown, and rebalancing the measuring circuit. If the galvanometer needle deflects in the other direction, the yoke 136 is likewise tilted the other way, and is returned to its normal position by contact with the cam 132, thus effecting a rebalancing of the measuring bridge circuit in an opposite sense or direction.

According to the present invention, a switch or pair of contacts 133a and 136a are arranged to close every time that the potentiometer circuit rebalances itself after a change of conditions resulting from a decrease of temperature. Thus, assuming that a decreased thermocouple current resulting from a lower temperature causes the galvanometer needle to travel to the right, whereby the right-hand arm of the yoke 136 is tilted upwards as shown in the drawing, to be reset by the cam 133, the contacts 133a and 136a may, for example, be attached to said arm and cam respectively, whereby the circuit of the wire 37 will be closed only under the conditions defined above, and the arrangement of Fig. 4 will operate in a manner similar to that of the arrangement of Fig. 3. It is evident that any other suitable arrangement of contacts, and any other suitable type of self-balancing potentiometers besides those described with regard to Figs. 3 and 4, may be used as long as such arrangement results in achieving the desired object of supplying a current pulse to the cycling unit 4 only at such times as the potentiometer unit rebalances itself to a lower temperature.

Figure 5:
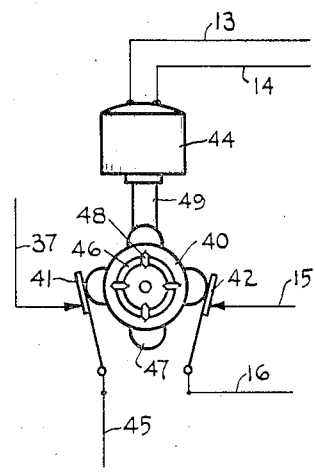
Figs. 5 and 6 are diagrams showing different embodiments of the timing or cycling means of the present system.

The timing or cycling unit 4 may consist of any arrangement suitable for periodically or cyclically actuating switches 41 and 42, which serve to close and to open the circuits of the reversing relay unit 5 and of the armature of motor 6, respectively. For example, as shown in Fig. 5, a constant speed unidirectional motor 44, receiving its power from leads 13 and 14, may drive through any suitable gear reducer mechanism 49, a cam 40 provided with projections 47 adapted to contact the spring-loaded, normally open switch members 41 and 42, thus cyclically closing and opening the desired circuits. If the self-balancing potentiometer of Fig. 4 is used, the motor 44 may be dispensed with, and the cam 40 may be directly mounted on or driven by the shaft 130, thus synchronizing the two devices. The constant frequency at which the switches 41 and 42 are opened and closed may be controlled, for purposes to be described hereinbelow, in any desired way, for example by adjusting the speed of the motor 44, by adjusting the gear reducer mechanism 49, or by varying the size, spacing or number of the cam projections 47, said projections being for this purpose adjustably held by means of removable bolts 48 in a slot 46 in the cam body.

Figure 6:
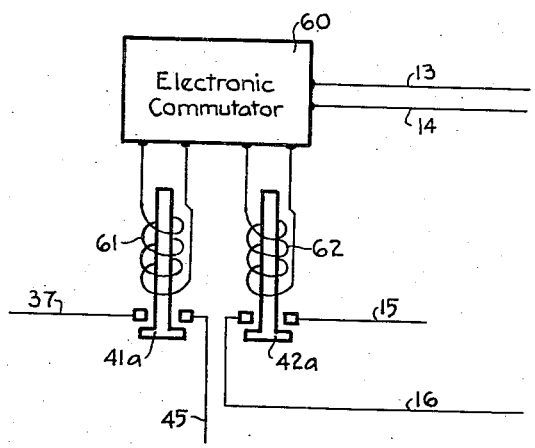

It is evident that the object of the timing unit, which is to open and to close at adjustable constant time intervals the circuits of the armature of the motor 6 and of the reversing relay unit 5, may be achieved by means other than cams, for example by means of mechanical or electronic commutators. Fig. 6 shows by way of illusutration an arrangement wherein an electronic commutator 60, having a circuit such, for example, as disclosed in application Ser. No. 410,010 filed September 8, 1941, by D. S. Muzzey et al, provides periodic pulses to solenoid coils 61 and 62, thus lifting the magnetic armatures or switch members 41a and 42a and closing the desired circuits.

The reversing relay unit 5, whose purpose is to reverse the direction in which the fuel-metering means are being actuated, for example by reversing the polarity of the field of the reversible motor 6 in response to current pulses received from the measuring bridge unit through the timing unit 4, may comprise any suitable reversing switch means of the mechanical or electronic type.

Figure 7:
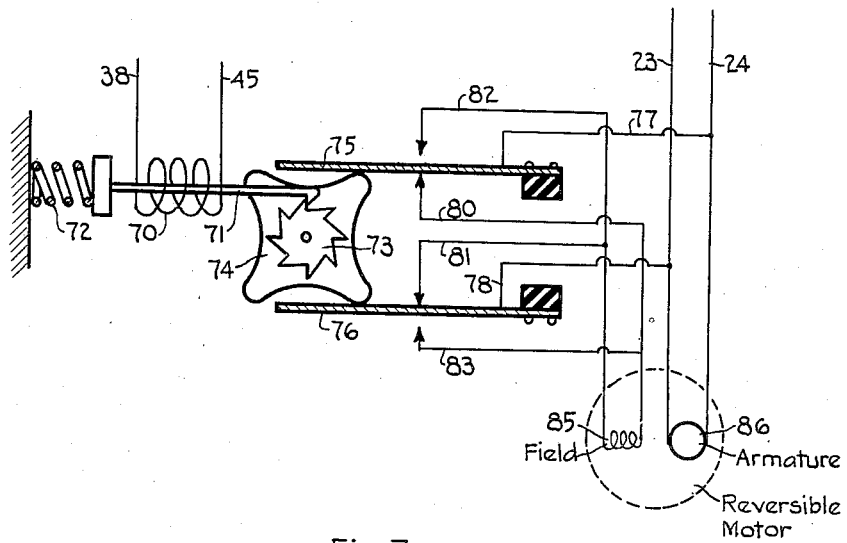
Fig. 7 is a diagram of the reversing relay means of the present invention.

Fig. 7 shows by way of illustration an arrangement wherein a solenoid coil 70, energized by unidirectional current pulses passed therethrough from the measuring bridge unit through the timing unit switch 41, acts to retract a pawl 71 against the action of a spring 72. The pawl 71 rotates a ratchet wheel 73, which drives a cam 74 through 45 degrees upon each retraction of the pawl 71. The cam 74 actuates spring loaded conductor members 75 and 76, connected to the leads 23 and 24 by means of leads 77 and 78 respectively, into contact with leads 80 and 81 in the position shown in the drawings, or with leads 82 and 83 when the cam is displaced by 45 degrees from the position shown in the drawings. The leads 80, 81, 82 and 83 being connected to the field 85 of the reversible motor as shown in Fig. 7, the direction of the current flow through said field, and therefore the direction of rotation of the reversible motor 6, will be reversed at each successive operation of the pawl 71, that is, at every unidirectional current pulse received through the timing unit 4.

The rotating shaft of the reversible motor 6 has attached thereto, through a torque-limiting clutch 25, a lever 26 adapted to actuate a rod 27, which operates, through a link 28, to increase or to decrease the fuel-air ratio of the mixture supplied to the engine by the fuel-injector device 7. The rod 27 has also attached thereto a handle and locking device 29, which, in combination with the torque-limiting clutch 25, permits the operator to override the control action of the present system and to determine the setting of the fuel-metering means manually at such times when the present automatic control is not desired for operational reasons.

The operation of the present system is as follows:

Any change of the exhaust temperature is translated into a change of the potential of the thermocouple 2, and causes the self-balancing measuring unit 3 to readjust itself to this new condition. If this change is caused by an increase of temperature, showing that the fuel-air ratio of the fuel injector 7 is either already set at its optimum value, or is being adjusted toward said optimum value, the automatic rebalancing of the measuring unit 3 produces no current pulse in the leads 37 and 38 as already stated in connection with the description of Figs. 3 and 4.

If, on the other hand, this change is caused by a decrease of temperature, showing either that the fuel-air ratio is improperly set, and is being adjusted in the incorrect direction whereby a mixture which is already too rich is made still richer, or a mixture which is too lean is made still leaner, the automatic rebalancing of the measuring unit 3 will produce a current pulse which is applied through the leads 37 and 38, connected to the timing unit 4 and to the reversing relay unit 5.

The function of the cycling unit 4 is to open and to close at predetermined and adjustable time intervals the switches 42 and 41. The closing of the switch 42 will energize both the field and the armature of motor 6 throughout an operative portion of each cycle of the timing unit and cause a rotation of said motor, in one direction or the other, depending on the way in which the field is connected, every time the switch 42 closes.

The closing of the switch 41, if no current pulse has been delivered by the self-balancing measuring unit 3, will produce no effect. The field of the motor 6 will therefore not be reversed, and said motor will rotate in the same direction as on the preceding closure cycle of the unit 4. If, however, a current pulse has been delivered by the self-balancing unit 3, the closing of the switch 41 will energize the reversing relay unit 5, and will reverse the field of the motor 6, thus causing said motor to rotate in a direction opposite to that of the preceding cycle.

Figure 10:
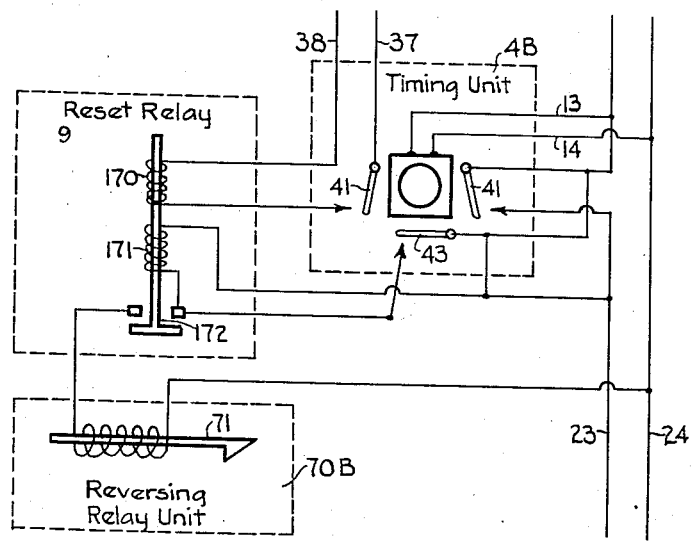
Fig. 10 is a diagram of a latch-in reset relay which may be used in combination with the timing and reversing relay units of the present system.

Since self-balancing potentiometers of the type illustrated in Fig. 3 operate on very small increments of time, the synchronization between the operation of units 3 and 4 is assured by the fact that the unit 3 rebalances several times during each closure of the switch 41. Since any even number of operations of the reversing unit 4 during a single cycle of the timing unit would obviously nullify the net effect of these operations, an auxiliary latch-in relay may be installed between the timing and the reversing unit to prevent the latter from operating more than once during each cycle. Such a relay may, for example, be of a mechanical latch-in electrical reset type made by the Struthers-Dunn Co., as shown on pages 14-15F of their catalog of July 1942. Likewise a similar relay 9 may be connected into the circuit of the present system as shown for purposes of illustration in Fig. 10. A pulse from the measuring unit passing through leads 37 and 38 and switch 41, energizes a relay coil 170, closing the switch 172 and thus energizing the coil 70B from leads 23 and 24 to operate the pawl 71 of the reversing relay unit. The closing of the switch 172 energizes also a hold-up coil 171, which maintains the switch 172 closed, thus insuring only one operation of the reversing relay unit per cycle, independently of the number of pulses transmitted through leads 37 and 38 during a single closure of the switch 41. The timing unit 4B is provided with an additional switch 43, similar in construction and operation to the switches 41 and 42, as described hereinabove with regard to Fig. 5. Switch 43 is adapted to remain open during the closure of switch 41, and to close briefly after switch 41 opens. The closing of switch 43 short-circuits and de-energizes the hold-up coil 172, thus opening the switch 172 and resetting the relay 9 for operation during the next cycle. In the case of self-balancing potentiometers of the type illustrated in Fig. 4, this synchronization may be achieved by operating the units 3 and 4 from a single motor shaft, as already described with regard to Figs. 4 and 5.

The object of the timing unit 4 is to give the system time, on each cycle, to react to a change of temperature due to a change of fuel-air ratio effected during the preceding cycle, and also to eliminate the effect on said system of extraneous temperature changes due to causes other than fuel-air ratio changes, such as variations in the temperature of the air, changes of level of an aircraft engine, etc. Taking into consideration the mechanical and electrical inertia of the various components of the system, the timing unit of said system should be adjusted, during calibration and tests, so that the operative cycle portion or period, $T_1$—$T_2$, during which the timing unit switches 41 and 42 close, coincides with the time period during which the voltage of the thermocouple changes at its highest rate following a time $T_0$ at which the fuel-air ratio has been changed on the preceding cycle. This synchronization may be effected, as already explained with regard to Figs. 5 and 6, by adjusting the speed or reducing gear of the cycling unit motor, by changing the size, shape or spacing of the cycling unit cams, by adjusting the electrical constants of an electronically operated timing unit, etc.

It will therefore be seen that the present automatic system permits the control of the fuel-air ratio, so as to maintain it at the point of the highest engine temperature corresponding to the most economical operation, under any possible set of conditions.

Thus, considering all possible sequences of events during a cycle A and an immediately consecutive cycle B, the following cases are possible:

1. If the fuel-air ratio is too low, and the fuel-metering has been actuated during cycle A to further decrease it, the engine temperature will decrease in the time interval between cycles A and B; the unit 3 will deliver a pulse to the timing device, and the closure of switch 41 on cycle B will reverse the field of the motor 6, whereby the closure of switch 42 on said cycle B will actuate the motor and the fuel-metering means in a direction opposite to that of cycle A.

2. If the fuel-air ratio is too low, but the fuel-metering means have already been actuated on cycle A in the proper direction to correct this ratio, the temperature of the engine will increase in the time interval between, no pulse will be supplied by the unit 3, and the closure of switch 41 on cycle B will remain inoperative, thus permitting the closure of the switch 42 to actuate the fuel-metering means in the same direction as on cycle A.

3. If the fuel-air ratio is too high, and the fuel-metering means have been actuated to further increase it during cycle A, the direction of said actuation will be reversed during cycle B in the manner described in case 1.

4. If the fuel-air ratio is too high, but the fuel-metering means have been actuated in the proper direction during cycle A, they will be actuated in the same direction during cycle B, as described in case 2.

When the maximum engine temperature, that is, the optimum operating condition is reached, the system will hunt within a very narrow range, from one side to the other of the mixture ratio corresponding to said maximum temperature. The effect of this hunting can be made negligible by adjusting the various timing, transmission and gearing factors so as to limit the single cycle change in fuel-air ratio to a small value.

Although the present system has been described hereinabove as involving the operation of a reversible motor 6, it will be understood that this invention is in no way limited to the use of such motor, but may comprise any combination of electrical or mechanical means capable of periodically actuating the fuel-metering element controlling the fuel-air ratio in such a manner as to modify said ratio in accordance with the indications of the temperature-responsive element.

Figure 8:
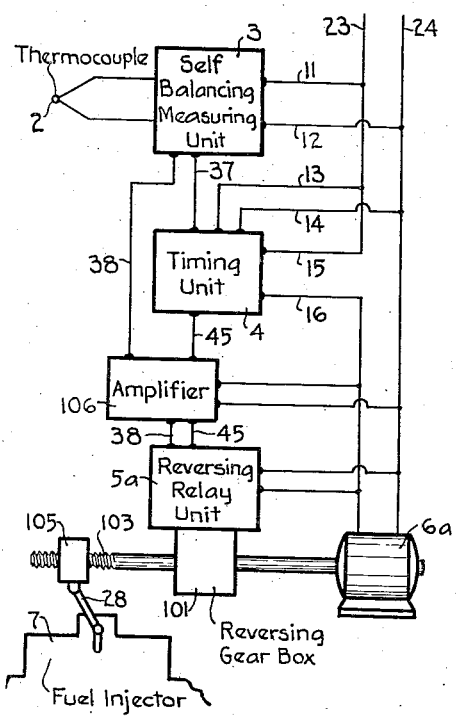
Figs. 8 and 9 are diagrams showing variations of the system of Fig. 1.

Thus, as diagrammatically shown in Fig. 8, a unidirectional, intermittently or cyclically operating motor 6a may be used instead of the reversing motor 6, the function of the reversing relay unit 5a consisting in this case not in reversing the field of motor 6, but in actuating a reversing gear box 101, thereby reversing the direction of rotation of a worm gear 103, connected to the shaft of the motor 6a through said reversing gear box, and causing a traveling nut 105, actuating the fuel-metering lever 28, to move in the opposite direction. An amplifier 106 may be inserted in the circuit of Fig. 8, as also in the circuit of Fig. 1, to increase the power of the pulses transmitted to the reversing relay unit.

Figure 9:
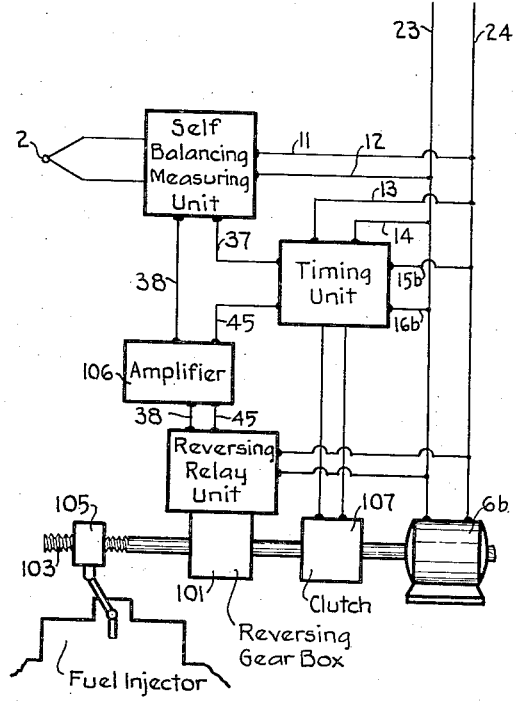

Likewise, a unidirectional, continuously operating motor 6b may be used, for example by inserting a magnetically operated clutch 107 in the drive between the motor 6b and the worm gear 103 so as to transmit the rotational motion of the motor 6b to the worm gear 103 only during the operative portion of each cycle. The wiring of the circuit of Fig. 8 can in this case be modified as shown in Fig. 9.

While the present invention has been described hereinabove with regard to preferred embodiments thereof, it is to be understood that suitable changes in construction, combination and arrangement of parts may be made without departing from the spirit or the scope of the invention as defined in the appended claims. It is obvious that the present system is fully adapted for use on multi-engine types of aircraft, wherein it may be made responsive, by means of suitable selective or timing switches, to the temperatures of the individual engines.

We claim as our invention:

1. For use in combination with a spark ignition type engine having fuel metering means adapted to adjust the combustion mixture in the direction of a higher or of a lower fuel-air ratio, a system comprising means for cyclically changing said fuel-air ratio, and means responsive to the temperature of the engine for controlling the direction of said change.

2. For use in combination with a spark ignition type engine having fuel metering means adapted to be selectively actuated in opposite directions to effect corresponding opposite changes in the fuel-air ratio of the mixture supplied to said engine, a system comprising means for actuating said fuel metering means at constant time increments to change said fuel-air ratio, and means responsive to the temperature of the engine for controlling the direction in which said fuel metering means are actuated.

3. In combination with a spark ignition type engine having fuel metering means adapted to be selectively actuated in opposite directions to effect corresponding opposite changes in the fuel-air ratio of the mixture supplied to said engine, a system comprising time-responsive means for cyclically actuating said fuel metering means to change said fuel-air ratio, and means comprising a thermocouple responsive to the engine exhaust temperature for controlling the direction in which said fuel metering means are actuated.

4. In combination with a spark ignition type engine having fuel metering means adapted to be selectively actuated in opposite directions to effect corresponding opposite changes in the fuel-air ratio of the mixture supplied to said engine, a system comprising timing means for cyclically actuating said metering means to change said fuel-air ratio, relay means for reversing the direction in which said fuel metering means are actuated, thermocouple means adapted to produce a varying potential in response to engine temperature changes, means for selectively translating potential variations responsive to temperature decreases into current pulses, and means for transmitting said current pulses to said relay means, whereby said relay means are energized to reverse the direction in which the fuel metering means are actuated.

5. In combination with a spark ignition type engine having fuel metering means adapted to be selectively actuated in opposite directions to effect corresponding opposite changes in the fuel-air ratio of the mixture supplied to said engine, a system comprising thermocouple means exposed to the temperature of the engine, and timing means adapted to actuate the fuel metering means at constant time intervals, said timing means being responsive to said thermocouple means for reversing the direction in which said metering means are actuated upon a decrease of the engine temperature during the time interval between two consecutive actuations of said fuel metering means.

6. In combination with a spark ignition type engine having fuel metering means adapted to be selectively actuated in opposite directions to effect corresponding opposite changes in the fuel-air ratio of the mixture supplied to said engine. a system comprising constant frequency timing means adapted to actuate said fuel metering means to change the fuel-air ratio throughout a predetermined operative portion of each cycle of said timing means, relay means adapted to reverse the direction in which said fuel metering means are actuated, thermocouple means adapted to produce variations of potential in response to a change of the engine exhaust temperature, measuring bridge means adapted to translate said potential variations into current pulses, means for selectively transmitting current pulses responsive to temperature decreases to said relay means through said timing means during the operative portion of a cycle of said timing means, whereby said relay means are energized and the fuel metering means are actuated during the operative portion of said cycle in a direction opposite to that of their actuation during the preceding cycle.

7. The system of claim 6, comprising adjustable means for regulating the frequency of the timing means.

8. The system of claim 6, comprising adjustable means for regulating the magnitude of the operative portion of a cycle of the timing means.

9. In combination with a spark ignition type engine having fuel metering means adapted to regulate the fuel-air ratio of the mixture supplied to said engine, a system comprising a reversible motor capable of selectively actuating said fuel metering means in one direction for increasing said fuel-air ratio, and in the other direction for decreasing said fuel-air ratio, constant frequency timing means adapted to energize said motor throughout a predetermined operative portion of a cycle of said timing means, relay means adapted to reverse the direction in which said motor rotates upon energization, thermocouple means adapted to produce a varying potential in response to engine exhaust temperature changes, measuring bridge means electrically connected to said thermocouple means and adapted to be automatically re-balanced against said potential variations, said measuring bridge means being provided with selective means for producing unidirectional current pulses upon each re-balancing occurring in response to a decrease of exhaust temperature, and means for transmitting said current pulses to said relay means through said timing means during the operative portion of a cycle of said timing means, said relay means being adapted to reverse the direction of rotation of said motor upon each consecutive energization by said unidirectional pulses.

10. For use in combination with a spark ignition type engine having fuel metering means adapted to be selectively actuated in opposite directions to effect corresponding opposite changes in the fuel-air ratio of the mixture supplied to said engine, a control system comprising temperature-responsive, measuring bridge, timing and relay units connected in circuit, said temperature-responsive unit being adapted to produce a varying potential in response to engine temperature changes and to apply said varying potential to said measuring bridge unit, said measuring bridge unit being adapted to translate selectively the potential variations responsive to a decrease of temperature into current pulses and to apply said pulses to the relay unit through the timing unit, said timing unit being adapted to actuate said fuel metering means at predetermined constant time intervals and to transmit said current pulses from the measuring bridge unit to the relay unit, and said relay unit being adapted to reverse the direction of actuation of said fuel metering means in response to said pulses, thereby changing said fuel-air ratio.

FRANCIS G. BOLLO.
JOHN R. TOMLINSON.